US008260724B2

(12) United States Patent
Babaioff et al.

(10) Patent No.: US 8,260,724 B2
(45) Date of Patent: Sep. 4, 2012

(54) ONLINE PRICING AND BUYBACK

(75) Inventors: Moshe Babaioff, Sunnyvale, CA (US);
Jason D. Hartline, Chicago, IL (US);
Robert D. Kleinberg, Ithaca, NY (US)

(73) Assignee: Microsoft Corporation, Redmond, WA (US)

( * ) Notice: Subject to any disclaimer, the term of this patent is extended or adjusted under 35 U.S.C. 154(b) by 789 days.

(21) Appl. No.: 12/211,825

(22) Filed: Sep. 17, 2008

(65) Prior Publication Data

US 2010/0070420 A1 Mar. 18, 2010

(51) Int. Cl.
*G06Q 20/00* (2012.01)
*G06Q 30/00* (2012.01)
(52) U.S. Cl. ............... 705/80; 705/14.71; 705/14.73; 705/26.1; 705/400
(58) Field of Classification Search .......... 705/80, 705/14.71, 14.73, 26.1, 400
See application file for complete search history.

(56) References Cited

U.S. PATENT DOCUMENTS

| | | | | |
|---|---|---|---|---|
| 6,035,286 A * | 3/2000 | Fried ..................... | 705/36 R |
| 6,985,885 B1 * | 1/2006 | Goldberg et al. ......... | 705/37 |
| RE40,091 E * | 2/2008 | Fried ..................... | 705/36 R |
| 7,379,781 B2 | 5/2008 | Treichler et al. | |
| 7,805,331 B2 * | 9/2010 | Demir et al. ............ | 705/14.4 |
| 2001/0056395 A1 * | 12/2001 | Khan ..................... | 705/37 |
| 2002/0046135 A1 * | 4/2002 | Lage ..................... | 705/26 |
| 2002/0046157 A1 * | 4/2002 | Solomon ................. | 705/37 |
| 2003/0005149 A1 * | 1/2003 | Haas et al. .............. | 709/238 |
| 2003/0154282 A1 * | 8/2003 | Horvitz .................. | 709/226 |
| 2004/0098332 A1 * | 5/2004 | Dvir ..................... | 705/37 |
| 2004/0133526 A1 * | 7/2004 | Shmueli et al. .......... | 705/80 |
| 2005/0137958 A1 * | 6/2005 | Huber et al. ............ | 705/37 |
| 2006/0106714 A1 * | 5/2006 | Goldberg et al. ......... | 705/37 |
| 2006/0178980 A1 * | 8/2006 | Goldberg et al. ......... | 705/37 |
| 2006/0253319 A1 | 11/2006 | Chayes et al. | |
| 2007/0130004 A1 | 6/2007 | Borgs et al. | |
| 2007/0168659 A1 * | 7/2007 | Gentry et al. ........... | 713/158 |
| 2007/0198449 A1 * | 8/2007 | Fokoue-Nkoutche et al. | 706/47 |
| 2008/0010099 A1 * | 1/2008 | Walker et al. ........... | 705/4 |
| 2008/0027803 A1 | 1/2008 | Mendelevitch et al. | |
| 2008/0103892 A1 | 5/2008 | Chatwin et al. | |
| 2008/0103895 A1 | 5/2008 | Burdick et al. | |
| 2008/0114661 A1 * | 5/2008 | Byde et al. ............. | 705/26 |
| 2008/0154662 A1 * | 6/2008 | Selvaraj et al. ......... | 705/7 |
| 2009/0037316 A1 * | 2/2009 | Zhou .................... | 705/37 |
| 2009/0037317 A1 * | 2/2009 | Zhou et al. ............. | 705/37 |
| 2010/0070420 A1 * | 3/2010 | Babaioff et al. ......... | 705/80 |

OTHER PUBLICATIONS

Matroid—Wikipedia; http://en.wikipedia.org/wiki/Matroid; accessed Mar. 9, 2011.*
Greedy Algorithms; http://math.fau.edu/locke/Greedy.htm; accessed Mar. 9, 2011.*
http://en.wikipedia.org/wiki/Matroid accessed by Examiner Sep. 1, 2011.*

(Continued)

*Primary Examiner* — John Weiss
*Assistant Examiner* — Adam Chornesky
(74) *Attorney, Agent, or Firm* — Microsoft Corporation

(57) ABSTRACT

A seller may sell advertisements, such as banner ads, to a buyer pursuant to a request made by the buyer to the seller. Each request has a value. The seller may accept the request from the buyer to provide a banner ad for the buyer at a later time. A request, once accepted, may be revoked at a cost which may be a fixed fraction of the request value. The cost may be referred to as a buyback cost. The buyback cost represents the cost of revoking a request that had been accepted. Additionally, matroid set systems and knapsack systems may use buyback techniques.

16 Claims, 5 Drawing Sheets

OTHER PUBLICATIONS http://en.wikipedia.org/wiki/Knapsack_problem accessed by Examiner Sep. 1, 2011.*

Subodha Kumar, Milind Dawande, and Vija S. Mookerjee; Optimal Scheduling and Placement of Internet Banner Advertisements; IEEE Transactions on Knowledge and Data Engineering, vol. 19, No. 11, Nov. 2007.*

Ligia Amado, and Paulo Barcia; Theory and Methodology New Polynomial Bounds for Matroiodal Knapsacks; European Journal of Operations Research 95 (1996) 201-210.*

DialogSrchMatroidKnapsack27jun2012; Dialog search performed Jun. 27, 2012.*

Hajiaghayi, et al, "Adaptive Limited-Supply Online Auctions", 2004, 10 Pages.

Andelman, et al, "Auctions with Budget Constraints", 2004, 12 Pages.

Babaioff, et al, "Incentive-Compatible, Budget-Balanced, yet Highly Efficient Auctions for Supply Chain Formation", Jan. 2, 2004, 43 Pages.

Borgs, et al, "Multi-unit auctions with budget-constrained bidders", 11 Pages, Proceedings of the 6th ACM conference on Electronic commerce, 2005.

Balcan, et al, "Sponsored Search Auction Design via Machine Learning", 5 Pages, 2005.

Babaioff, et al, "A Knapsack Secretary Problem with Applications", 15 Pages, Aug. 28, 2007.

Robert Kleinberg, "A Multiple-Choice Secretary Algorithm with Applications to Online Auctions", 2 Pages, 2005.

Sandholm, "Advantages of a Leveled Commitment Contracting Protocol", 8 Pages, 1996.

Mehta, "AdWords and Generalized On-line Matching", 19 Pages, 2007.

Rusmevichientong, et al, "An Adaptive Algorithm for Selecting Profitable Keywords for Search-Based Advertising Services", Jul. 16, 2007, 43 Pages.

Harstad, et al, "An "Alternating Recognition" Model of English Auctions", Management Science © 2000 INFORMS vol. 46, No. 1, Jan. 2000, pp. 1-12.

Noga, "An Online Partially Fractional Knapsack Problem", Proceedings of the 8th International Symposium on Parallel Architectures, Algorithms and Networks (ISPAN'05), 2005.

George S.Lueker, "Average-Case Analysis of Off-Line and On-Line Knapsack Problems", Journal of Algorithms 29, pp. 277-305, 1998.

Chakrabarty, et al, "Budget Constrained Bidding in Keyword Auctions and Online Knapsack Problems", 10 Pages, 2007.

Borgs, et al, "Dynamics of Bid Optimization in Online Advertisement Auctions", 2007, 10 Pages.

Aggarwal, et al, "Knapsack Auctions", Proceedings of the seventeenth annual ACM-SIAM symposium on Discrete algorithm, pp. 1083-1092, 2006.

Babaioff, et al, "Matroids, Secretary Problems, and Online Mechanisms", Proceedings of the eighteenth annual ACM-SIAM symposium on Discrete algorithms, pp. 434-443, 2007.

Buchbinder, et al, "Online Primal-Dual Algorithms for Maximizing Ad-Auctions Revenue", 2007, 26 Pages.

Iwama, et al, "Optimal Resource Augmentations for Online Knapsack", pp. 180-188, 2007.

Iwama, et al, "Removable Online Knapsack Problems", P. Widmayer et al. (Eds.): ICALP 2002, LNCS 2380, pp. 293-305, 2002.

Biyalogorsky, et al, "Research Note: Overselling with Opportunistic Cancellations", Marketing Science 1999 INFORMS vol. 18, No. 4,1999, pp. 605-610.

Constantin, et al, "Online Ad Slotting With Cancellations", May 8, 2008, 10 Pages.

* cited by examiner

ONLINE PRICING AND BUYBACK

BACKGROUND

On the Internet, display advertising on web pages appears in the form of web banners known as banner ads. Banners ads can comprise static or animated images, as well as interactive media that may include audio and video elements.

The banner ads shown on some websites are sold by negotiated contract in advance. The impression inventory is diverse, with advertisers looking to meet campaign limits in terms of demographics targets (who an ad is shown to), temporal targets (when an ad is shown), and location targets (where an ad is shown). Any particular advertiser request may be able to be met in a variety of ways.

A seller of advertisements such as banner ads has a complex online optimization task. Advertisers are buyers of advertisements and send requests to buy advertisements from the seller. As advertiser requests to buy banner ads arrive at the seller, the seller decides whether the requests should be accepted or not. This is a complex task to perform with any reasonable quality guarantee when formulated as an online optimization problem. There may be thousands of advertisers on a website. Inventory may be preallocated to advertisers at a low value early. It may not ever be learned that advertisers arriving later would have paid a premium for the same inventory. Absent this knowledge, there is little basis for a seller to accept or decline ad requests placed by advertisers.

SUMMARY

A seller may sell advertisements, such as banner ads, to a buyer pursuant to a request made by the buyer to the seller. Each request has a value which may be an amount a buyer is willing to pay if the advertisement is shown. The seller may accept the request from the buyer to provide a banner ad for the buyer at a later time. A request, once accepted, may be revoked at a cost which may be a fixed fraction of the request value. The cost may be referred to as a buyback cost. The buyback cost represents the cost of revoking a request that had been accepted. Additionally, matroid set systems and knapsack systems may use buyback techniques as described further herein.

In an implementation, a request having a value may be received. It may be determined whether the value of the request is greater than a value based on a previously accepted value of a previously accepted request and a buyback factor. If so, then the request may be accepted and the previously accepted request may be revoked. A buyback cost may be paid to the buyer associated with the previously accepted request.

In an implementation, the value based on the previously accepted value of the previously accepted request and the buyback factor may be equal to a parameter r multiplied by the previously accepted value of the previously accepted request, the parameter r being greater than or equal to one. The parameter r may be equal to $(1+f+\sqrt{(f(1+f))})$, where f is the buyback factor and f is greater than zero.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
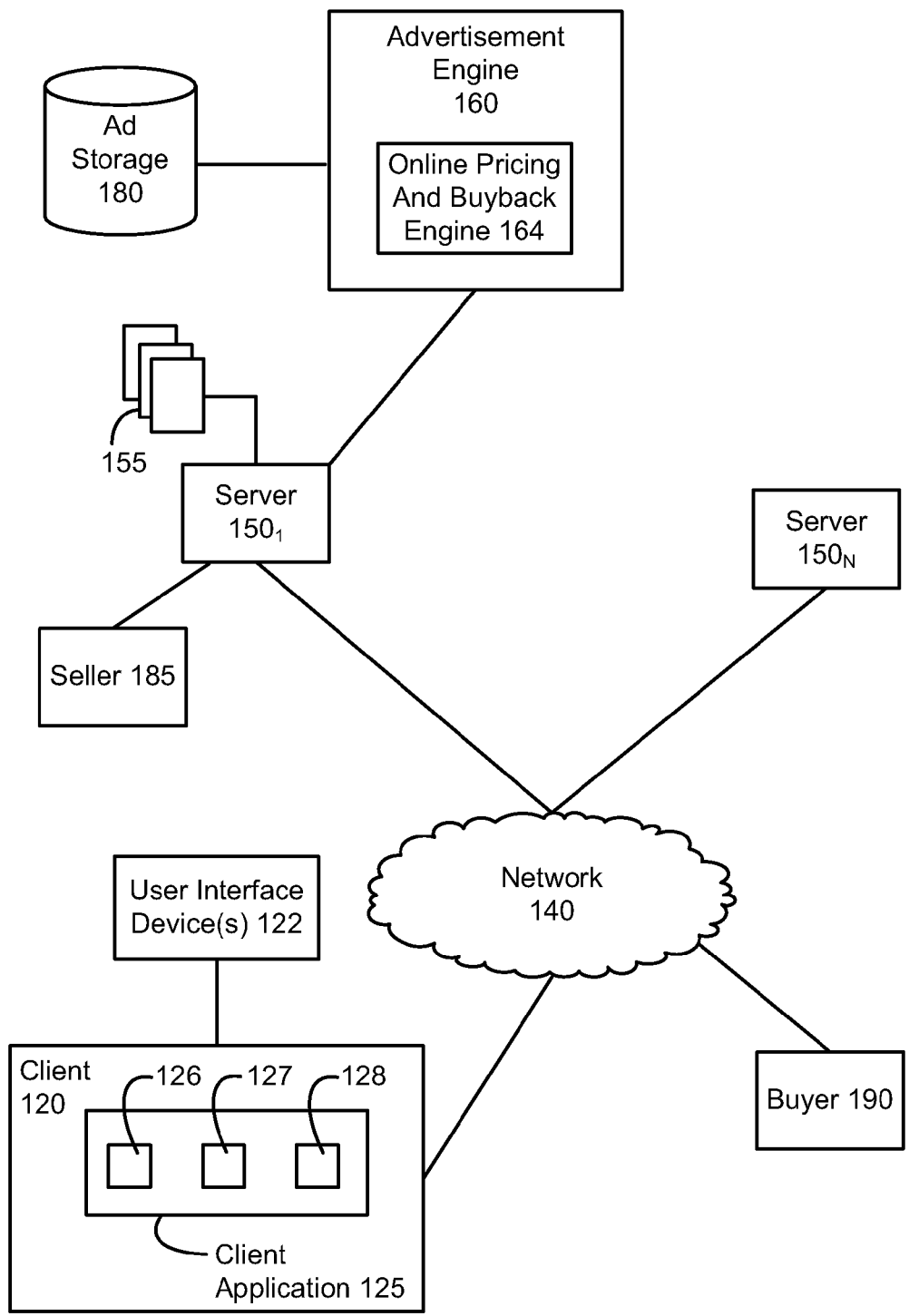
FIG. 1 is a block diagram of an implementation of a system that may be used to provide online pricing and buyback.

FIG. 1 is a block diagram of an implementation of a system that may be used to provide online pricing and buyback. FIG. 1 illustrates an exemplary network environment 100. In the network environment 100, a client 120 may communicate through a network 140, such as the Internet, a wide area network (WAN), a local area network (LAN), 3G, or other communications network for example, with a plurality of servers $150_1$ to $150_N$. The client 120 may be configured to communicate with any of the servers $150_1$ to $150_N$ to access, receive, retrieve and display media content and other information such as web pages, websites, and advertisements 155 such as banner ads, for example. In an implementation, a seller of advertisements 185 (also referred to herein as a seller) may be associated with a server. A buyer of advertisements 190 (also referred to herein as a buyer) may communicate with the seller 185 through the network 140. In an implementation, the buyer 185 may be associated with a client.

In some implementations, the client 120 may include a desktop personal computer, workstation, laptop, personal digital assistant (PDA), cell phone, or any wireless application protocol (WAP) enabled device or any other computing device capable of interfacing directly or indirectly with the network 140. The client 120 may run an HTTP client, e.g., a browsing program, such as MICROSOFT INTERNET EXPLORER or other browser, or a WAP-enabled browser in the case of a cell phone, PDA or other wireless device, or the like, allowing a user of the client 120 to access, process, and view information and pages available to it from the servers $150_1$ to $150_N$.

The client 120 may also include one or more user interface devices 122, such as a keyboard, a mouse, touchscreen, pen or the like, for interacting with a graphical user interface (GUI) provided by the browser on a display (e.g., monitor screen, LCD display, etc.), in conjunction with pages, forms, and other information provided by the servers $150_1$ to $150_N$ or other servers. Implementations described herein are suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to an implementation, a client application 125 executing on the client 120 may include instructions for controlling the client 120 and its components to communicate with the servers $150_1$ to $150_N$ and to process and display data content received therefrom. Additionally, the client application 125 may include various software modules for processing data and media content. For example, the client application 125 may include one or more of a search module 126 for processing search requests and search result data, a user interface module 127 for rendering data and media content in text and data frames and active windows, e.g., browser windows and dialog boxes, and an application interface module 128 for interfacing and communicating with various applications executing on the client 120. Further, the interface module 127 may include a browser, such as a default browser configured on the client 120 or a different browser.

According to an implementation, the servers $150_1$ to $150_N$ are configured to provide data and media content such as web pages and advertisements 155 such as banner ads to the client 120. In certain aspects, one or more of the servers $150_1$ to $150_N$ may also be configured to comprise an advertisement engine 160 that gathers, maintains, and displays advertisements 155. The advertisement engine 160 may comprise an online pricing and buyback engine 164 that may perform online pricing and buyback as described herein. An ad storage 180 may be provided for storage of advertisements 155. One or more of the servers $150_1$ to $150_N$ may provide advertisements 155 from the ad storage 180 to the client 120 when providing content to the client 120.

The servers $150_1$ to $150_N$ may be part of a single organization, e.g., a distributed server system such as that provided to users by a search provider or other content provider, or they may be part of disparate organizations. The servers $150_1$ to $150_N$ each may include at least one server and an associated database system, and may include multiple servers and associated database systems, and although shown as a single block, may be geographically distributed. An example server may comprise, or be comprised within, a computing environment such as that described with respect to FIG. 5.

The seller 185 may sell advertisements 155, such as banner ads, to the buyer 190 pursuant to a request made by the buyer 190 to the seller 185. Buyback refers to markets in which prior allocation decisions, such as an acceptance by the seller 185 of an advertisement request from the buyer 190, can be revoked, but at a cost. The seller 185 may accept requests from buyers to provide banner ads for the buyers at some later time, such as after the end of a period in which requests may be received and/or considered by the seller 185. With buyback, accepted requests may be revocable.

In an implementation, the seller 185 may receive requests, each having a request value, from buyers and may choose which requests to accept, subject to constraints on the subsets of requests which may be accepted simultaneously. A request, once accepted, may be revoked (i.e., canceled) at a cost which may be a fixed fraction of the request value. The cost may be referred to as a buyback cost. The buyback cost represents the cost of revoking a request that had been accepted.

Techniques are provided that guarantee some fraction of the optimal revenue for various scenarios. Competitive ratios that are used may be a constant; that is, techniques may guarantee some constant fraction of the optimal revenue, for any input sequence, parameterized by a coefficient representing a level of commitment of the seller 185.

If the seller 185 decides to revoke a request that was already accepted, it may compensate the buyer who issued that request. In an implementation, an accepted request having a request value v may be revoked at any time at a cost proportional to the request value v. The buyback cost of such a v-valued request may be f*v, where f may be a buyback factor, such as a fixed buyback factor that is greater than zero. Thus, if the buyer 190 provides a request e has value $v_e$ if the request is accepted, and if the seller 185 accepts the request and later revokes the acceptance of the request, the buyer 190 may be paid a buyback cost in the amount of $f*v_e$ to compensate for the revocation of the acceptance.

As a sequence of requests arrive to the seller 185 (e.g., online), acceptance and revocation decisions may be made that satisfy conditions such as, for example, (a) at any time the set of accepted requests is feasible, (b) a request may only be accepted at the time it arrives (i.e., once a request is rejected it cannot be accepted later), and (c) a request may be revoked (i.e., bought back) at a penalty of the buyback factor at any time, but once revoked it may not subsequently be re-accepted. After the last request arrives and has been processed (e.g., accepted or denied), the set of accepted requests that have not been revoked are served. In an implementation, the total payoff may be the cumulative value of the served requests less the cumulative buyback cost, i.e., the cumulative value of the revoked requests scaled by the buyback factor.

Figure 2:
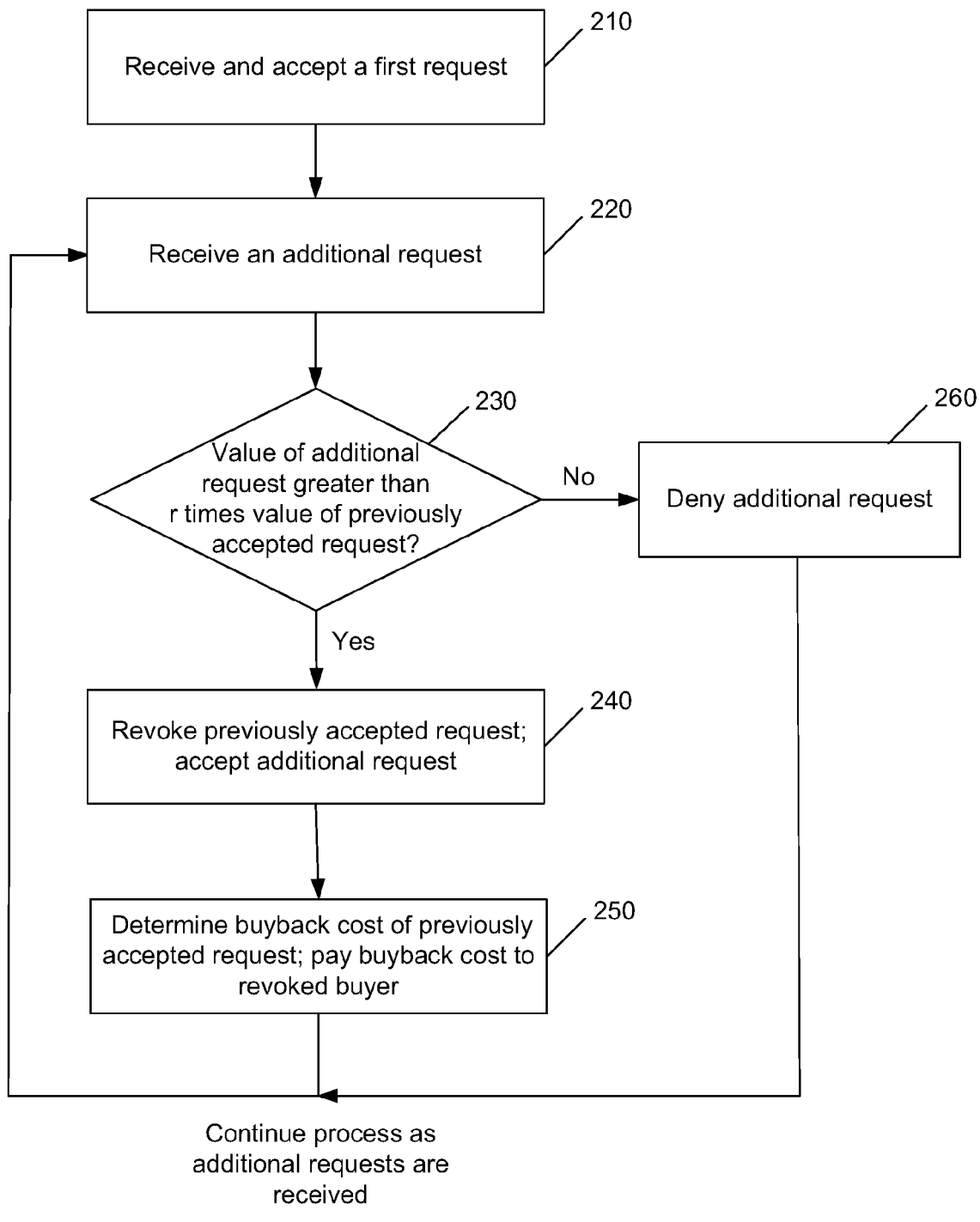
FIG. 2 is an operational flow of an implementation of a method of online pricing and buyback for a single item.

FIG. 2 is an operational flow of an implementation of a method 200 of online pricing and buyback for a single item. In an implementation, a parameter $r \geq 1$ may have a value that is dependent on a buyback factor f. As described further below, it has been determined that an optimal competitive ratio may be achieved in an implementation by setting $r=1+f+\sqrt{(f(1+f))}$.

For a single item, a number n of requests from buyers may be received online at a seller in an arbitrary order. Each request may have a value and it may be determined whether to accept the current request based on whether it would be profitable to buy back a previously accepted request at a buyback cost and accept the current request.

At 210, a first request of the n requests may be received by the seller and accepted. The rest of the n requests may be considered in order of arrival as follows. At 220, an additional request of the n requests is received. At 230, it may be determined if the value of the additional request is greater than r times the value of the previously accepted request (e.g., the first request).

If so, at 240, the previously accepted request may be revoked and the additional request may be accepted. At 250, a buyback cost for the previously accepted request may be determined and paid to the revoked buyer. The compensation to the buyer of the revoked request (i.e., the buyback cost) may be proportional to the value of the request. Using a buyback factor f, a revoked acceptance on request i (or buyer i in an implementation) whose request has a value of $v_i$ results in a buyback cost of $f*v_i$.

If the value of the additional request is not greater than r times the value of the previously accepted request at 230, the additional request may be denied at 260. Processing may continue at 220 as additional requests are received. Thus the total value of the requests picked, less the cost of the buybacks, may be approximately maximized. A technique with buyback may be competitive for any set of requests and any arrival order for these requests, i.e., an adversarial model.

Setting r=1+f corresponds to accepting a new bid whenever it is profitable to do so. However, r=1+f results in an unbounded competitive ratio. This may be seen, for example, by considering a bid sequence defined recursively by $v_1=1$, $v_{i+1}=(1+f)v_i+\epsilon$ for some arbitrarily small $\epsilon>0$. For every n>0, the profit after n+1 bids is only $1+\epsilon n$, whereas the optimum profit is greater than $(1+f)^n$.

In an implementation, a single item method such as that described with respect to the method 200 may have a competitive ratio of $(r(r-1))/(r-1-f)$. For a fixed buyback factor f>0, this function may be minimized by setting $r=1+f+\sqrt{(f(1+f))}$, resulting in the competitive ratio of $1+2f+2\sqrt{(f(1+f))}$. This ratio is optimal for deterministic techniques.

In an implementation, a matroid system in which there are many possible substituting slots (e.g., sites for advertisements such as banner ads) may be considered. Sets of requests which may be simultaneously satisfied may comprise independent sets of a matroid. This class of domains may include, for example, advertising markets in which each request is for a unit of supply coming from a specified subset of the available supply. In an implementation, each request is for a unit of supply which implies that the sets of compatible requests are the independent sets of a transversal matroid.

Matroid set systems generalize many relevant allocation problems. A uniform matroid of rank k represents feasible sets of winners of a k-unit allocation problem. The transversal matroid represents feasible sets of winners when there is a matching constraint. Transversal matroids exemplify an aspect of the display advertising problem: that certain advertisers are only interested in certain impressions (e.g., based on demographic, time of day, web page, etc.).

Figure 3:
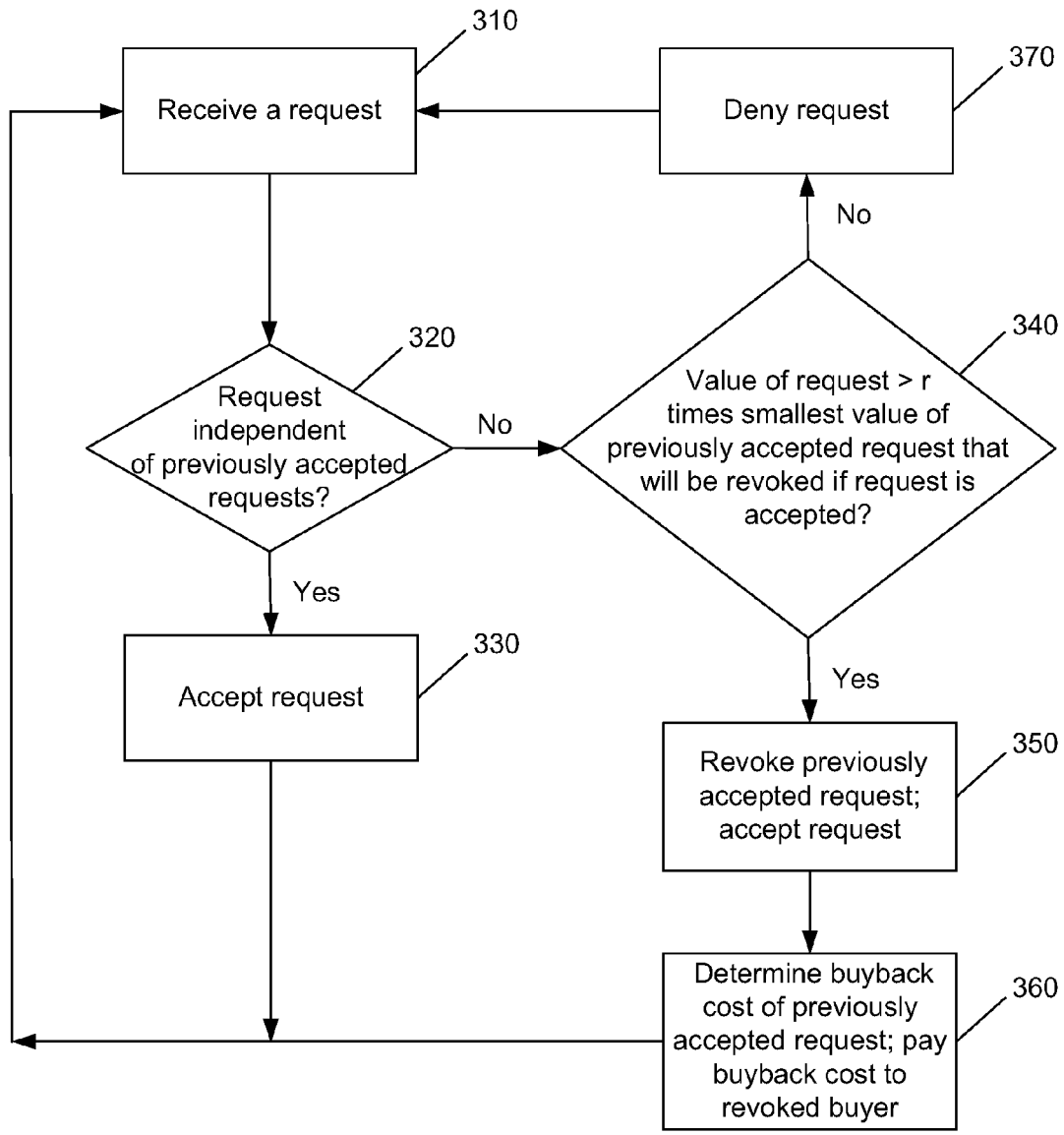
FIG. 3 is an operational flow of an implementation of a method of online pricing and buyback for matroids.

FIG. 3 is an operational flow of an implementation of a method 300 of online pricing and buyback for matroids. At 310, a request may be received at the seller. It may be determined at 320 whether the request is independent of previously accepted requests. If so, the request may be accepted at 330 and processing may continue at 310.

If the request is not independent of the previously accepted requests as determined at 320, then it may be determined at 340 whether the value of the request is more than r times the smallest value of a previously accepted request that will be revoked if the current request is accepted. If so, at 350, the previously accepted smallest valued request may be revoked and the current request may be accepted. The buyback cost of the previously accepted smaller valued request may be determined and paid to the revoked buyer at 360 and processing may continue at 310. If it is determined at 340 that the value of the request is not greater than r times the smallest value of a previously accepted request that will be revoked if the request is accepted, then the request may be denied at 370 and processing may continue at 310.

This technique is $r(r-1)/(r-1-f)$ competitive. For fixed f>0, the competitive ratio is minimized at $r=1+f+\sqrt{(f(1+f))}$, resulting in the competitive ratio of $1+2f+2\sqrt{(f(1+f))}$.

In an implementation, a knapsack system may be considered. The knapsack problem is a well known problem in combinatorial optimization. It derives its name from the maximization problem of an optimal choice of elements that can fit into one bag to be carried on a trip. Given a set of elements, each with a cost and a value, it may be determined the subset of such elements to include in the bag so that the total cost is less than a given limit and the total value is as large as possible.

A knapsack like problem is obtained when there is a limited number of impressions (such as banner ads) that a seller may provide and buyers (i.e., advertisers) request varying quantities of a homogeneous but limited number of impressions. Buyers' ad campaigns may request different quantities of inventory from the seller, and a buyer may want their request to be all fulfilled or all denied, as either they run their full campaign or no campaign. In an implementation, there may be a single commodity, e.g., one banner ad is being shown to web traffic that is not demographically or temporally segregated. The quantities and values of the requests of the buyers to the seller form an online knapsack problem.

A deterministic online buyback technique achieves a bi-criteria approximation result. With no assumption, randomization approaches for knapsack can be used to convert the approximation technique to one that has a constant approximation factor (for constant f).

As described further herein, if the largest request from a buyer is of size at most γ times the knapsack capacity, where $0<\gamma<1$, then a competitive ratio of $1+2f+2\sqrt{(f(1+f))}$ may be obtained with respect to the optimum solution for a knapsack whose capacity is scaled down by a factor of $(1-2\gamma)$.

Figure 4:
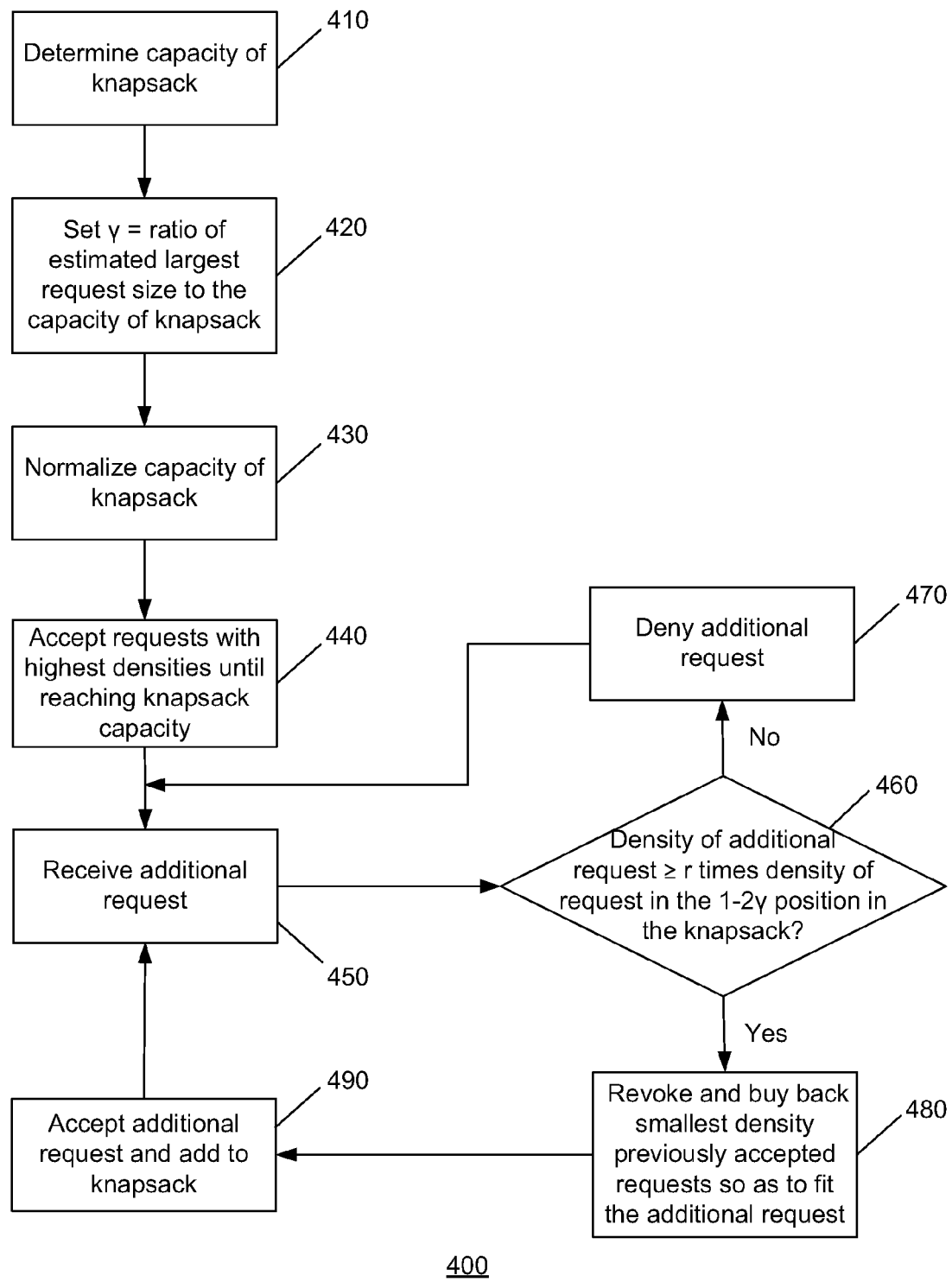
FIG. 4 is an operational flow of an implementation of a method of online pricing and buyback for a knapsack.

FIG. 4 is an operational flow of an implementation of a method 400 of online pricing and buyback for a knapsack. At 410, the capacity C of the knapsack of the seller may be determined.

At 420, a factor γ may be set equal to the ratio of the estimated largest request size to the capacity C of the knapsack. At 430, the capacity of the knapsack may be normalized, e.g., to C=1. In this manner, each request has a size at most equal to γ.

At 440, requests may be received from buyers. Each buyer may provide a request i with value $v_i$ for $s_i$ units of the good. A density for each request may be determined as $v_i/s_i$. The requests with the highest densities may be accepted until the next request exceeds the knapsack capacity C.

In an implementation, requests may be accepted using a greedy fractional offline technique on a knapsack with restricted capacity $C=1-2\gamma$, but may penalize requests which are not yet in the knapsack by a multiplicative factor of r>1. When the knapsack's capacity is exceeded, requests may be bought back greedily, starting from the requests with the lowest density, until the remaining requests fit the capacity constraint once again.

At 450, an additional request k may be received. At 460, it may be determined if the density of the additional request k is at least equal to r times the density of the request in the $1-2\gamma$ position in the knapsack. If so, then the smallest density (i.e., lowest density elements) requests may be revoked and bought back (at a buyback factor of f) so as to fit the request k at 480. The request k may be accepted and added to the knapsack at 490 and processing may continue at 450. If the density of the additional request is not at least equal to r times the density of the request in the $1-2\gamma$ position as determined at 460, the additional request k may be denied at 470 and processing may continue at 450. For $\gamma<½$, the technique is $(r(r-1))/(r-1-f)$ competitive with respect to a knapsack of size $1-2\gamma$.

In an implementation, randomization of the techniques may be used with respect to a knapsack situation. For example, a first technique, such as a technique described with respect to the method 500 of FIG. 5, may be used a certain portion of the time (e.g., with probability ⅔). A second technique, such as a technique described with respect to the method 300 of FIG. 3, may be used another portion of the time (e.g., with probability ⅓). In this manner, a better competitive ratio may be obtained. For example, with $r=1+f+\sqrt{(f(1+f))}$, for any y, the technique is $3*(1+2f+2\sqrt{(f(1+f))})$ competitive with respect to the optimal outcome over the entire knapsack.

Figure 5:
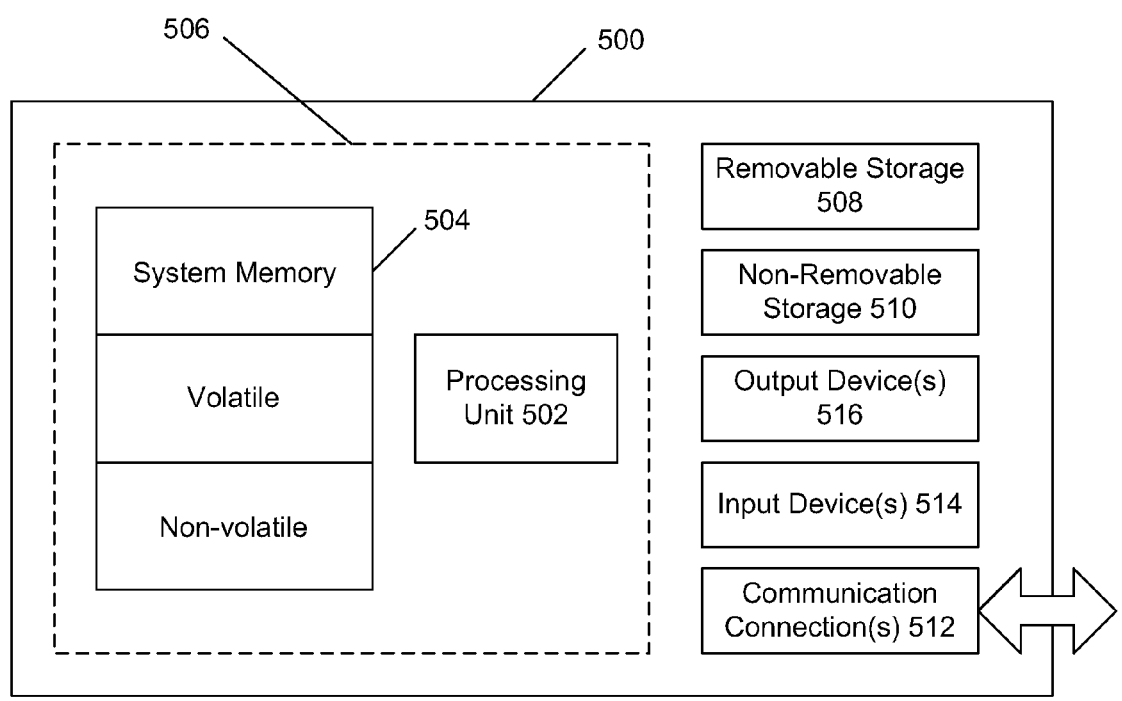
FIG. 5 shows an exemplary computing environment.

FIG. 5 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by device 500 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communications connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An online pricing and buyback method, comprising:
   receiving, at a computing device, a request having a value;
   determining, by the computing device, whether the value of the request is greater than a parameter r multiplied by a previously accepted value of a previously accepted request, the parameter r being at least equal to one; and
   if the value of the request is greater than the parameter r multiplied by the previously accepted value of the previously accepted request, then accepting the request, revoking the previously accepted request, and paying a buyback cost to a buyer associated with the previously accepted request, by the computing device.

2. The method of claim 1, wherein the request comprises a request for buying a banner ad on a website.

3. The method of claim 1, wherein if the value of the request is not greater than the parameter r multiplied by the previously accepted value of the previously accepted request, then denying the request.

4. The method of claim 1, wherein the buyback cost is equal to the previously accepted value of the previously accepted request multiplied by a buyback factor f.

5. The method of claim 4, wherein the parameter r is a function of the buyback factor f.

6. The method of claim 1, wherein the parameter r is greater than one.

7. The method of claim 1, wherein the parameter r is equal to $(1+f+\sqrt{(f(1+f))})$, where f is the buyback factor and f is greater than zero.

8. The method of claim 1, further comprising receiving an additional request having an additional value, determining whether the additional value is greater than the parameter r multiplied by the previously accepted value of the previously accepted request, and if so, then accepting the additional request, revoking the previously accepted request, and paying an additional buyback cost to an additional buyer associated with the previously accepted request.

9. An online pricing and buyback method for a computing device comprising a matroid system, the method comprising:
   receiving and accepting a plurality of requests at the computing device, each of the requests having an associated value;
   receiving, at the computing device, an additional request having a value; and
   determining, by the computing device utilizing the matroid system, whether the additional request is independent of the plurality of requests and if so, then accepting the additional request, and otherwise determining if the value of the additional request is greater than the value of one of the plurality of requests that will be rejected if the additional request is accepted, wherein determining if the value of the additional request is greater than the value of one of the plurality of requests comprises determining if the value of the additional request is greater than a parameter r times a smallest value of one of the plurality of requests, wherein the parameter r is greater than one, wherein if the value of the additional request is greater than the parameter r times the smallest value of one of the plurality of requests that will be rejected if the additional request is accepted, then revoking the request of the plurality of requests having the smallest value and accepting the additional request; and otherwise, denying the additional request, wherein if revoking the request, then determining a buyback cost and paying the buyback cost to a buyer associated with the request that is revoked.

10. The method of claim 9, wherein the buyback cost is equal to the value of the request that is revoked multiplied by a buyback factor f that is greater than zero.

11. The method of claim 10, wherein the parameter r is equal to $(1+f+\sqrt{(f(1+f))})$.

12. The method of claim 9, wherein the requests and the additional request are received online, and each of the requests and the additional request is for buying an associated banner ad on a website.

13. A computer-readable storage medium comprising computer-readable instructions for online pricing and buyback for a computing device corresponding to a knapsack, said computer-readable instructions comprising instructions that cause a computer to:

receive a plurality of requests, each request having a value and a size;

determine a density of each request with regard to the knapsack, the density being equal to the value divided by the size;

accept the requests until a capacity of the knapsack is reached, each request that is accepted having a position in the capacity according to a density sorted order;

receive an additional request having a value and a size;

determine whether to accept or deny the additional request based on the density of the additional request and the density of at least one of the plurality of requests that has been accepted; and revoke and buy back at least some of the requests that have been accepted that have the smallest density so as to fit the additional request in the capacity, if the additional request is accepted.

14. The computer-readable storage medium of claim 13, wherein the instructions that cause the computer to determine whether to accept or deny the additional request comprise instructions that cause the computer to compare the density of the additional request with a parameter r times the density of one of the requests that has been accepted, wherein the parameter r is greater than one.

15. The computer-readable storage medium of claim 14, further comprising instructions that cause the computer to determine a ratio $\gamma$ of the size of an estimated largest request of the requests that have been received and normalize the capacity, wherein the density of one of the requests that has been accepted is the density of the request having a position of $(1-2\gamma)$ in the capacity based on the density sorted order.

16. The computer-readable storage medium of claim 15, further comprising instructions that cause the computer to accept the additional request if the density of the additional request is at least equal to the parameter r times the density of the request having a position of $(1-2\gamma)$ in the capacity.

* * * * *